US009609590B2

(12) United States Patent
Chandrasekaran et al.

(10) Patent No.: US 9,609,590 B2
(45) Date of Patent: Mar. 28, 2017

(54) ECO-FRIENDLY POWER OVER ETHERNET (71) Applicant: ARUBA NETWORKS, INC., Sunnyvale, CA (US)

(72) Inventors: Sridhar P Chandrasekaran, Karnataka (IN); Madani Adjali, Long Island City, NY (US); Divya Shanmugam, Tamil Nada (IN); Ando Shin, Fairfax, VA (US)

(73) Assignee: Aruba Networks, Inc., Sunnyvale, CA (US)

( * ) Notice: Subject to any disclaimer, the term of this patent is extended or adjusted under 35 U.S.C. 154(b) by 21 days.

(21) Appl. No.: 14/264,887

(22) Filed: Apr. 29, 2014

(65) Prior Publication Data
US 2015/0312853 A1 Oct. 29, 2015

(51) Int. Cl.
*H04W 52/02* (2009.01)
*H04L 12/10* (2006.01)

(52) U.S. Cl.
CPC ......... *H04W 52/0209* (2013.01); *H04L 12/10* (2013.01); *Y02B 60/43* (2013.01); *Y02B 60/44* (2013.01)

(58) Field of Classification Search
None
See application file for complete search history.

(56) References Cited

U.S. PATENT DOCUMENTS

| 2005/0243861 | A1* | 11/2005 | Elkayam | H04L 12/10 370/466 |
| 2008/0052546 | A1* | 2/2008 | Schindler et al. | 713/300 |
| 2009/0049315 | A1* | 2/2009 | Diab et al. | 713/310 |
| 2010/0106985 | A1* | 4/2010 | Panguluri | G06F 1/266 713/300 |
| 2011/0103229 | A1* | 5/2011 | Fidler | H04L 41/0681 370/241 |
| 2013/0013949 | A1* | 1/2013 | Mohammed | G06F 1/266 713/340 |

* cited by examiner

*Primary Examiner* — Huy D Vu
*Assistant Examiner* — James P Duffy
(74) *Attorney, Agent, or Firm* — Brooks, Cameron & Huebsch, PLLC (57) ABSTRACT

The present disclosure discloses a method and network device for providing an eco-friendly PoE mechanism in a WLAN. Specifically, a network device determines that an access point (AP) is connected to two or more network devices that include functionality to power the first AP, selects a first network device and causes the first network device to power the AP instead of the second network device, which is currently powering the AP. Moreover, the network device disables power supply on a first port of the second network device that is connected to the AP, causing the first network device to supply power to the AP via a second port of the first network device that is connected to the AP. Subsequent to the first network device supplying power to the AP via the second port, the network device enables the power supply on the first port of the second network device.

19 Claims, 7 Drawing Sheets

COMMAND
300

RESULT (OCES-IDF-A) #SHOW NEIGHBOR-DEVICES | INCLUDE AP225-INTERNAL
320
GE0/0/23    9c:1c:12:c0:a2:fe    eth1    110    AP225-INTERNAL
GE1/0/23    9c:1c:12:c0:a2:fe    eth0    101    AP225-INTERNAL

FIG. 3A

| AREA$_1$ (GROUP A) 330 | AREA$_2$ (GROUP B) 340 |
|---|---|
| AREA$_3$ (GROUP B) 350 | AREA$_4$ (GROUP A) 360 |

FIG. 3B

| SWITCH IDENTIFIER 370 | NUMBER OF ACCESS POINTS 380 | GROUP IDENTIFIER 390 |
|---|---|---|
| M0 | 5 | A |
| M1 | 10 | B |
| ... ... | ... ... | ... ... |

FIG. 5

ECO-FRIENDLY POWER OVER ETHERNET

FIELD

The present disclosure relates to power management in a wireless local area network (WLAN). In particular, the present disclosure relates to an improved mechanism for providing power over Ethernet (PoE) in WLANs in an eco-friendly manner.

BACKGROUND

Wireless digital networks, such as networks operating under the current Electrical and Electronics Engineers (IEEE) 802.11 standards, are spreading in their popularity and availability. New generations of access points may include support for dual-ports. Specifically, an access point (AP) may be connected to an Ethernet switch via two or more alternative ports. In some cases, at least two ports are enabled with power over Ethernet (PoE) functionalities. Thus, the access point can draw power from either port.

Nonetheless, when an access point is physically connected to two or more PoE ports, it is nondeterministic which port the AP will draw its power from. Typically, the switch that the AP is connected to controls which devices can draw power from its PoE-enabled ports. The AP does not typically have the control over from which PoE port it will draw power from.

The lack of control by an AP to determine which PoE to draw power from can lead to some problematic scenarios. For example, it is possible that all APs in a WLAN system end up drawing power from one switch. In the event of a failure in the switch, all of the APs will be temporarily out of power, and thus causing disruption in WLAN services.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to power management in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to power management in a wireless local area network (WLAN). In particular, the present disclosure relates to an improved mechanism for providing eco-friendly PoE in WLANs.

With the solution provided herein, the disclosed network device determines that a first access point is connected to two or more network devices (such as an Ethernet switch) that include functionality to power the first access point (e.g., via Power over Ethernet). The disclosed network device selects a first network device of the two or more network devices to power the first access point, causing the first network device to power the first access point instead of a second network device that is currently powering the first access point. Note that, the first network device is different than a second network device of the two or more network devices. For example, the first network device can be a first member switch of a switch stack, whereas the second network device can be a second and different member switch of the same switch stack.

In some embodiments, prior to selecting the first network device, the disclosed network device determines a first number of devices powered by the first network device and/or a second number of devices powered by the second network device. Furthermore, the disclosed network device selects the first network device based on the first number and/or the second number. For example, if the first member switch powers 2 access points and the second member switch powers 5 access points, the disclosed network device will select the first member switch to power the first access point because the first member switch powers fewer access points than the second member switch.

In some embodiments, prior to selecting the first network device to power the first access point, a second network device powers the first access point. The disclosed network device further disables power supply on a first port of the second network device that is connected to the first access point, causing the first network device to supply power to the first access point via a second port of the first network device that is connected to the first access point. Moreover, subsequent to causing the first network device to supply power to the first access point via the second port, the disclosed network device may enable the power supply on the first port of the second network device.

Computing Environment

Figure 1:
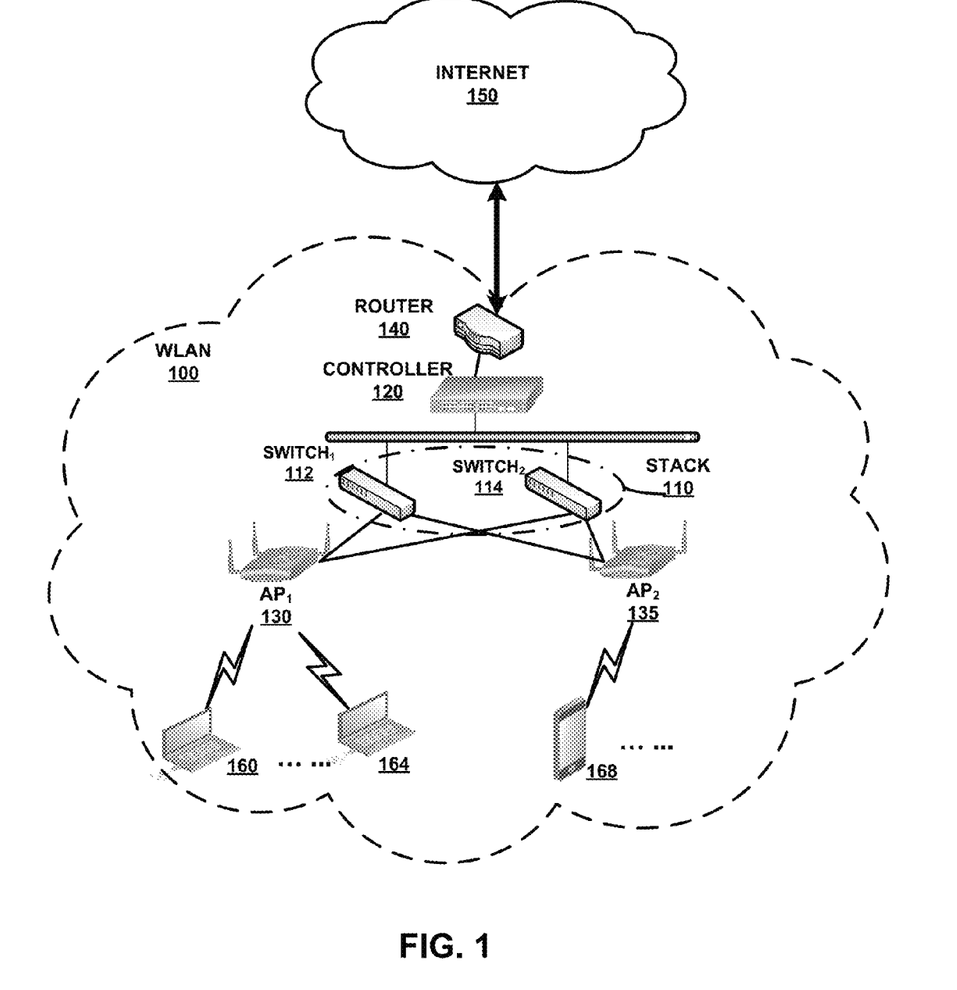
FIG. 1 shows exemplary computing environment according to embodiments of the present disclosure.

FIG. 1 shows exemplary computing environment according to embodiments of the present disclosure. Specifically, FIG. 1 includes a controller 120 and a switch stack 110 in a wireless local area network (WLAN) 100. Switch stack 110 further includes two or more switches, such as switch₁ 112 and switch₂ 114, etc. WLAN 100 may be also connected to Internet 150 or another external network via a router 140. Moreover, switch stack 110 is communicatively coupled with one or more access points (APs), such as AP₁ 130 and AP₂ 135, to provide wireless network services by transmitting network packets to a number of wireless client devices, such as client devices 160-164 and 168, etc.

Network according to embodiments of the present disclosure may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers, access points or routers capable of controlling functions, etc. Each network control plane device may be located in a separate sub-network. The network control plane device may manage one or more network management devices, such as access points or network servers, within the sub-network.

Moreover, in the exemplary network depicted in FIG. 1, a number of client devices are connected to the access points in the WLAN. For example, client devices 160-164 are associated with $AP_1$ 130, and client devices, such as client device 168, are associated with $AP_2$ 135. Note that, client devices may be connected to the access points via wired or wireless connections.

During operations, a wireless station, such as client device 160, client device 164, or client device 168, is associated with a respective access point, e.g., access point $AP_1$ 130, access point $AP_2$ 135, etc. Each AP is connected to an Ethernet via one or more ports. As illustrated in FIG. 1, $AP_1$ 130 has at least two ports that are connected to $switch_1$ 112 and $switch_2$ 114 respectively. Likewise, $AP_2$ 135 also has at least two ports that are connected to $switch_1$ 112 and $switch_2$ 114 respectively.

Here, $switch_1$ 112 and $switch_2$ 114 are both members of the same switch stack 110. Switch stack 110 generally refers to a group of stackable switches that are set up to operate together. Each switch in switch stack 110 is capable of operating as a standalone switch. However, when operating as a group, the group of stackable switches shows common characteristics of a single switch but having port capacity of the sum of the combined switches. The common characteristics of the stack acting as a single switch includes, but is not limited to, using a single Internet Protocol (IP) address for remote administration of all switch units in the stack as a whole, rather than using an individual IP address for administration of each switch unit in the stack.

Assuming that both $AP_1$ 130 and $AP_2$ 135 have dual-port functionalities. New generations of APs can sustain up to 1.4-1.5 GB throughput in compliance with IEEE 802.11ac standards. The capabilities of these APs would be constrained without the dual-port functionalities. By allowing a single AP to connect to two or more switches, an AP can obtain increased bandwidth to meet the requirements of IEEE 802.11ac standards.

In some embodiments, the AP is connected to the switches via a Link Aggregation Control Protocol (LACP) interface. LACP generally refers to a subcomponent of IEEE 802.3ad standards. It allows for exchange of information with regard to the link aggregation between two members of the aggregation. In some embodiments, the AP is connected to the switches via a port-channel interface, which typically is a logical or virtual interface that represents an aggregation of member interfaces are LACP-enabled. For example, if LACP is used on two ports of a network device that belong to the same LACP group, a port-channel is created for the two ports.

In addition, with the dual-port functionalities, both $AP_1$ 130 and $AP_2$ 135 can draw power from either $switch_1$ 112 or $switch_2$ 114 as long as the AP is physically connected to the switches. A switch supporting PoE function can periodically transmit a pulse through a respective port to detect a threshold level of resistance, which indicates that a PoE-enabled device is attached to the respective port of the switch. When an AP is connected to multiple switches through multiple ports, the AP will receive multiple pulses through each port from each switch. However, the AP can receive power through only one port. Thus, the port of the AP that detects the response pulse first will become the PoE power supplier for the AP. Therefore, the determination of which switch is the PoE supplier for the AP depends on the pulse detection time, which can be affected by a number of factors, such as the cable distance between the AP and the switch, etc. Specifically, long cable distance is typically associated with delay in pulse detection time.

In an exemplary scenario, assuming that a stack has two member switches, and that the stack is connected to 24 dual-port access points. Also, each AP is connected to two member switches. Thus, there will be a total of 48 cables connecting the APs and the switches in the stack. Because of the determination of which switch supplies power to which AP is nondeterministic, it is possible that majority of the APs receive PoE power supply from the first switch and only a small number of APs receive PoE power supply from the second switch. If the first switch had a failure, then all of the APs connected to it will be powered down temporarily until they are powered up by the second switch in the stack. After the first switch is restored, all of the APs will continue receiving PoE power supply from the second switch. The first switch merely provides Open System Interface (OSI) layer-2 connectivity.

According embodiments of the present disclosure, the disclosed system can identify that an AP is physically connected to two different switches within the same stack. Moreover, the disclosed system can inspect the load balance from a global perspective. For example, a controller or master controller in the system may determine that $switch_1$ 112 is currently powering 20 APs in WLAN 100, whereas $switch_2$ 114 is powering 50 APs in WLAN 100 at the same time. Thus, the disclosed system may initiate some actions that redistribute APs in WLAN 100 to draw powers from $switch_1$ 112 and $switch_2$ 114 evenly.

Problem Scenarios

FIGS. 2A-2E illustrate exemplary use cases requiring eco-friendly PoE according to embodiments of the present disclosure. Although only a few problem scenarios are illustrated in FIG. 2A-2E, it shall be understood that the solution described herein can be applicable to many other similar use case scenarios without departing from the spirit of present invention. For simplicity of illustration, FIGS. 2A-2E each includes two switches, namely $switch_1$ 210 and $switch_2$ 215, as well as two access points, namely $AP_1$ 220 and $AP_2$ 225. Both switches belong to the same switch stack. Moreover, both APs support dual-port functionalities and thus can draw PoE power supply from either switch. As such, each AP is physically connected to both switches. In general, in FIGS. 2A-2E, a solid line between an AP and a switch indicates that the AP is receiving PoE power supply from the switch at the time; a dotted line between an AP and a switch indicates that the AP is physically connected to the switch but is not presently receiving PoE power supply from the switch. Also, for illustration purposes only, assuming that AP1 220 and AP2 225 are both located within the same physical area and providing complementary WLAN coverage for the physical area.

Figure 2A:
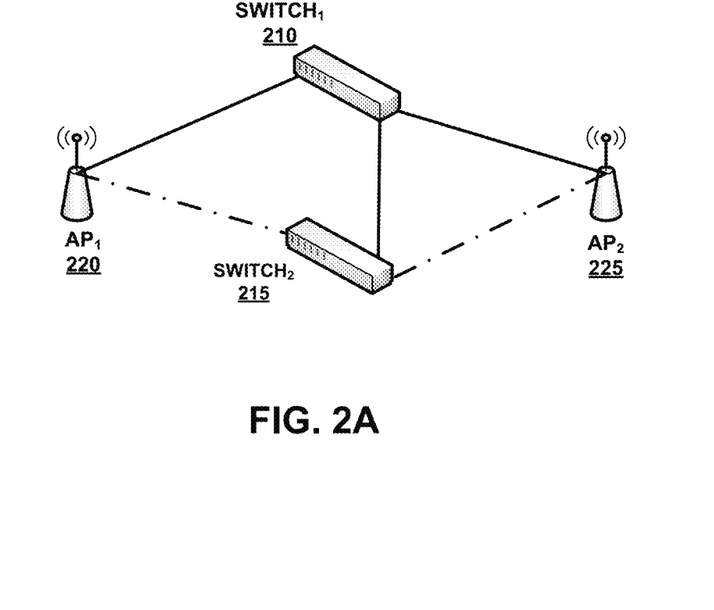
FIGS. 2A-2E illustrate exemplary use cases requiring eco-friendly PoE according to embodiments of the present disclosure.

Specifically, FIG. 2A illustrates an example in which both $AP_1$ 220 and $AP_2$ 225 end up receiving PoE power supply from $switch_1$ 210. As mentioned above, this may be due to a relatively short cable distance between $switch_1$ 210 and the APs (e.g., $AP_1$ 220 and $AP_2$ 225). Since both $switch_1$ 210 and $switch_2$ 215 are from the same stack, they can also be referred to as member$_0$ and member$_1$ of the stack. If switch$_1$ 210 powers down, then both AP$_1$ 220 and AP$_2$ 225 will experience temporarily loss of power until it can start to receive PoE power from switch$_2$ 215.

In addition, FIGS. 2B-2E collectively illustrate an example in which even though AP$_1$ 220 and AP$_2$ 225 were initially evenly distributed between switch$_1$ 210 and switch$_2$ 215, they still end up both receiving PoE power supply from switch$_1$ 210.

Figure 2B:
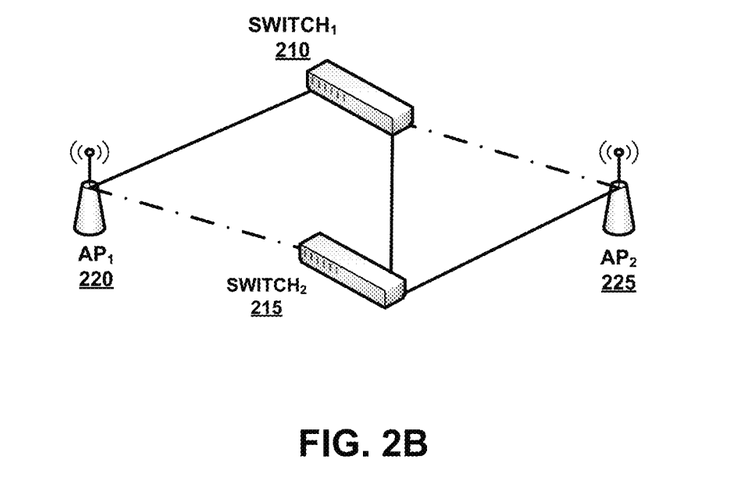

First, as illustrated in FIG. 2B, upon powering up, AP$_1$ 220 receives PoE power supply from switch$_1$ 210; and, AP$_2$ 225 receives PoE power supply from switch$_2$ 215. Conventionally, the first switch that detects the pulse resistance from an AP becomes the switch that powers the AP. Therefore, there is no way to control which switch provides PoE power supply for which AP. Hence, the only way to guarantee this type of even distribution is by manually plugging in each AP to its designated primary source of PoE power supply first, and plugging in the respective AP to its secondary source of PoE power supply only after the respective AP has been powered up by its primary source of PoE power supply. Thus, AP$_1$ 220 will need to be manually plugged in switch$_1$ 210, and subsequently be plugged in switch$_2$ 215 after AP$_1$ 220 has been powered up by switch$_1$ 210. Likewise, AP$_2$ 225 will need to be manually plugged in switch$_2$ 215, and subsequently be plugged in switch$_1$ 210 after AP$_2$ 225 has been powered up by switch$_2$ 215.

Figure 2C:
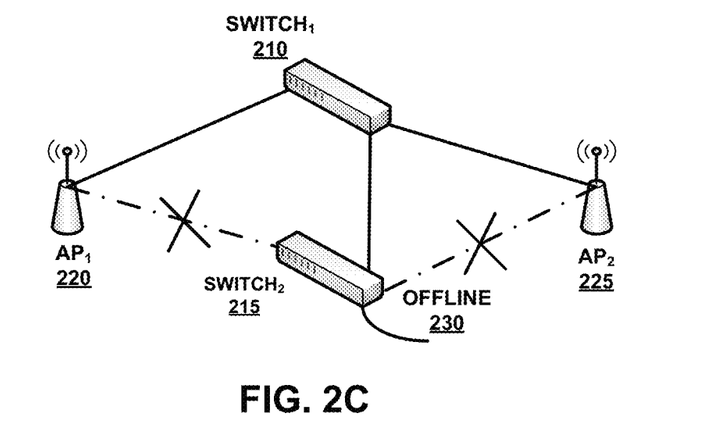

Next, as illustrated in FIG. 2C, switch$_2$ 215 is taken into an offline state 230, for example, due to a device failure, or reboot, or scheduled maintenance that has caused the switch to be out of service, etc. As a result, AP$_2$ 225 is affected by the change because its power is drawn from switch$_2$ 215. Thus, both AP$_1$ 220 and AP$_2$ 225 now receive PoE power supply from switch$_1$ 210.

Figure 2D:
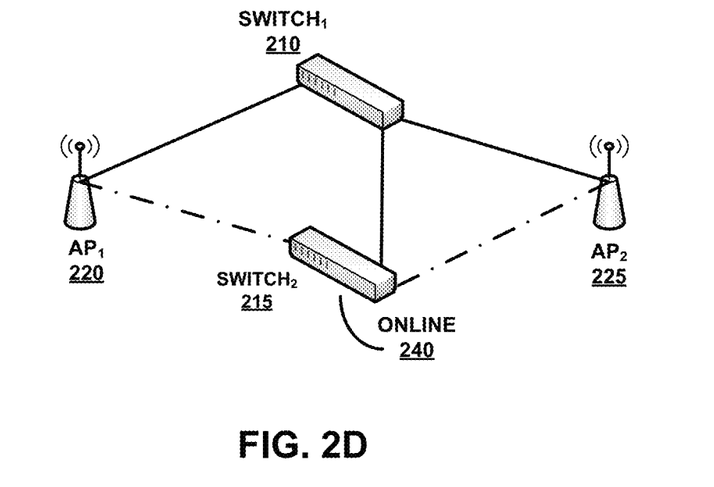

Further, as illustrated in FIG. 2D, switch$_2$ 215 is now back into an online state 240. Nevertheless, with conventional technology, there is no mechanism to redistribute AP$_1$ 220 and AP$_2$ 225 across the switches in the stack, namely switch$_1$ 210 and switch$_2$ 215, to regain the even distribution prior to the failure of switch$_2$ 215.

Figure 2E:
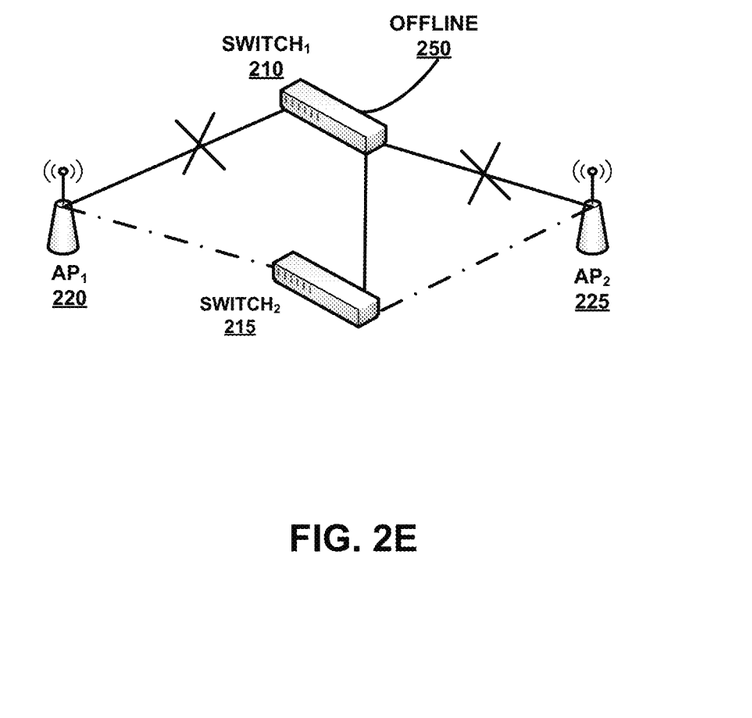

Finally, as illustrated in FIG. 2E, assuming that switch$_1$ 210 goes into an offline state 250. As a result, both AP$_1$ 220 and AP$_2$ 225 will experience temporary power loss, because they are both receiving PoE power supply from switch$_1$ 210 after switch$_2$ 215 goes in the offline state. Note that, the infrastructure is in a worse situation after switch$_1$ 210 becomes offline than it was in after the temporary period of offline state of switch$_2$ 215. This is because, after the temporary period of offline state of switch$_2$ 215, there is still one AP active providing some WLAN coverage for the physical area. However, after switch$_1$ 210 becomes offline, there is no active AP providing any WLAN coverage for the physical area, because both AP$_1$ 220 and AP$_2$ 225 lose their PoE power supply from switch$_1$ 210 and are waiting to be detected by switch$_2$ 215.

In summary, FIG. 2A illustrates a problem scenario of overloading a subset of switches in a switch stack. FIGS. 2B-2E, on the other hand, illustrates a problem scenario that may have an impact on the WLAN coverage for clients. For example, WLAN clients located in the particular physical area where AP$_1$ 220 and AP$_2$ 225 are deployed may experience a change from full WLAN coverage, to partial WLAN coverage, to no WLAN coverage during the event of one or more switch failures.

Eco-Friendly PoE

Figure 3A:
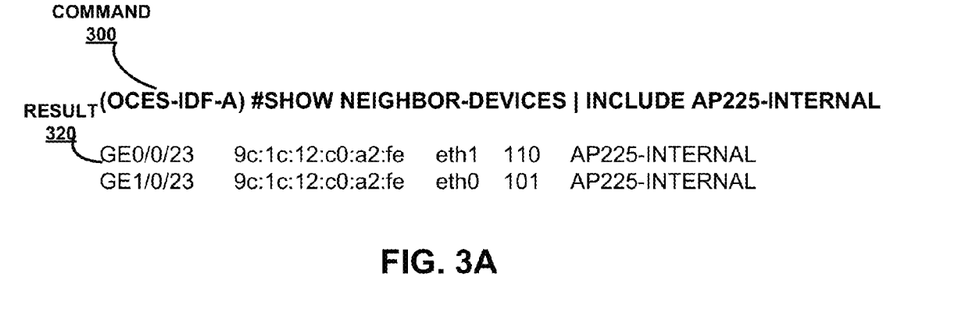
FIGS. 3A-3C illustrate exemplary solutions for eco-friendly PoE according to embodiments of the present disclosure.
Figure 3B:
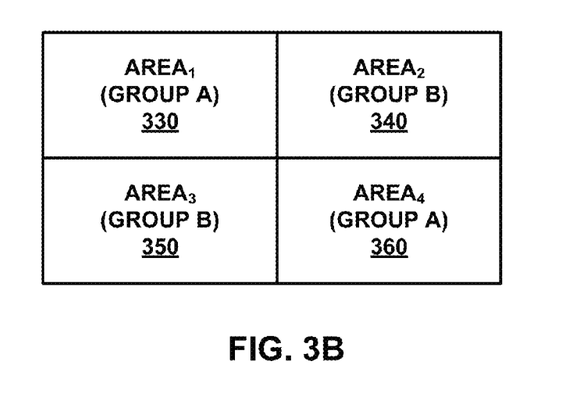

FIGS. 3A-3B illustrate exemplary solutions for eco-friendly PoE according to embodiments of the present disclosure. Embodiments of the present disclosure use a discovery protocol, such as, the Link Layer Discovery Protocol (LLDP), etc. LLDP generally is a vendor-neutral link layer protocol in the Internet Protocol Suite used by network devices for advertising their identity, capabilities, and neighbors on an IEEE 802 local area network, principally wired Ethernet. The protocol is formally referred to by the IEEE as Station and Media Access Control Connectivity Discovery specified in standards document IEEE 802.1ab.

Information that may be retrieved may include, but is not limited to, system name and description, port name and description, VLAN name, IP management address, system capabilities (switching, routing, etc.), MAC/PHY information, MDI power, link aggregation, etc.

Typically, LLDP can be used as a discovery protocol that to identify APs in a network as from a particular vendor. Here, LLDP is also used to identify whether the discovered AP has dual-port functionalities, and whether the discovered AP is connected to two or more switches via multiple PoE ports. Thus, LLDP provides a mechanism for WLAN infrastructure vendor to identify its own AP devices in the network as well as the specific switch ports that each AP is connected to.

Specifically, FIG. 3A illustrates an exemplary LLDP command and results. For example, command 300 (OCES-IDF-A) #SHOW NEIGHBOR-DEVICES|INCLUDE AP225-INTERNAL returns information about an AP with a particular name (e.g., AP225-INTERNAL) and its connected ports.

In the example illustrated in FIG. 3A, executing command 300 returns at least the following results 320:

| GE0/0/23 | 9c:1c:12:c0:a2:fe eth1 110 | AP225-INTERNAL |
| GE1/0/23 | 9c:1c:12:c0:a2:fe eth0 101 | AP225-INTERNAL |

Here, 9c:1c:12:c0:a2:fe indicates the MAC address of the AP, which is used as a unique identifier of the AP. Note that, other unique identifiers, such as host names, tag information, etc., can also be used to identify the AP instead of the MAC address. AP225-INTERNAL indicates the name of the AP. Moreover, GE0/0/23 and GE1/0/23 indicate the switch ports that the AP identified by the MAC address 9c:1c:12:c0:a2:fe is physically connected to. In particular, GE0 represents member$_0$ of the switch stack, and GE1 represents member$_1$ of the switch stack; 23 represents the port number. Moreover, eth1 and eth0 refer to the respective port of the AP via which the AP is connected to a respective switch; 110 and 101 represent timer output, etc.

Therefore, from the first line of result 320, the system can detect that Ethernet port eth1 of the AP with MAC address 9c:1c:12:c0:a2:fe is connected to port 23 of member$_0$ in the switch stack. From the second line of result 320, the system can detect that Ethernet port eth0 of the AP with MAC address 9c:1c:12:c0:a2:fe is connected to port 23 of member$_1$ in the switch stack.

In addition, the system may use another command, e.g., #SHOW POE INTERFACE, to obtain information regarding which port an AP is currently receiving PoE power from. From results returned from such command, the system can specifically identify that GE0/0/23 is not supplying any PoE power to the AP, but GE1/0/23 is supplying PoE power to the AP. Thus, the switches in the stack would know that the AP with MAC address 9c:1c:12:c0:a2:fe is connected to both member$_0$ and member$_1$, but is only receiving PoE power supply from member$_1$.

Note that, the information illustrated in FIG. 3A includes information associated with all switches within a particular switch stack and are accessible by all switches within the same switch stack. A switch member in the stack can access information of an AP even though the AP is not physically connected to the switch member, as long as the AP is physically connected to another switch member of the same stack. Moreover, to the AP, the switch stack functions as a single switch with combined capacities of multiple members.

The following code example illustrates descriptions of PoE interfaces of different switches in a switch stack as returned by command (host) #show poe interface—
GE0/0/0
-------
GE0/0/0: Administratively Enable, Port status: Off
Maximum power: 30000 mW, Power consumption: 0 mW
Port voltage: 0 mV, Port current: 0 mA
PD class: Class-0, Priority: Low, PSE port status: Off, PD detection in progress
GE0/0/1
-------
GE0/0/1: Administratively Enable, Port status: Off
Maximum power: 30000 mW, Power consumption: 0 mW
Port voltage: 0 mV, Port current: 0 mA
PD class: Class-0, Priority: Low, PSE port status: Off, PD detection in progress
GE0/0/2
-------
GE0/0/2: Administratively Disable, Port status: Off
Maximum power: 30000 mW, Power consumption: 0 mW
Port voltage: 0 mV, Port current: 0 mA
PD class: Class-0, Priority: Low, PSE port status: Off, CLI admin disabled The following code example illustrates statuses of PoE interfaces of different switches in a switch stack as returned by command (host) #show poe interface brief—

| PoE Interface Brief | | | | |
|---|---|---|---|---|
| Interface | Admin | Consumption (mW) | Port Priority | Port Status |
| GE0/0/0 | Enable | 0 | Low | Off |
| GE0/0/1 | Enable | 0 | Low | Off |
| GE0/0/2 | Disable | 0 | Low | Off |
| GE0/0/3 | Enable | 0 | Low | Off |
| GE0/0/4 | Enable | 0 | Low | Off |
| GE0/0/5 | Enable | 0 | Low | Off |
| GE0/0/6 | Enable | 0 | Low | Off |
| GE0/0/7 | Enable | 0 | Low | Off |
| GE0/0/8 | Enable | 0 | Low | Off |
| GE0/0/9 | Enable | 0 | Low | Off |
| GE0/0/10 | Enable | 0 | Low | Off |
| GE0/0/11 | Disable | 0 | Low | Off |
| GE0/0/12 | Enable | 4300 | Low | On |
| GE0/0/13 | Enable | 0 | Low | Off |
| GE0/0/14 | Enable | 0 | Low | Off |
| GE0/0/15 | Enable | 0 | Low | Off |
| GE0/0/16 | Enable | 0 | Low | Off |
| GE0/0/17 | Enable | 0 | Low | Off |
| GE0/0/18 | Enable | 0 | Low | Off |
| GE0/0/19 | Enable | 0 | Low | Off |
| GE0/0/20 | Enable | 0 | Low | Off |
| GE0/0/21 | Enable | 0 | Low | Off |
| GE0/0/22 | Enable | 0 | Low | Off |
| GE0/0/23 | Disable | 0 | Low | Off |

Using information provided by protocols, such as the LLDP, etc., the disclosed system can evaluation the distribution of APs across members of a stack and detect a PoE overloaded switch member in the stack. The information includes, but is not limited to, whether a particular port of a particular AP is connected to a particular port of a particular switch member of a stack and whether the connected AP is receiving power from the connection, etc. In some embodiments, an optimal distribution of APs is achieved when there are even numbers of APs receiving PoE power from each switch member of the stack.

In some embodiments, a network/system administrator may create smart tags or smart groups to identify the APs. Thus, a block or cluster of APs may be associated with the same tag or group. For example, in FIG. 3B, a network administrator can further divide up physical WLAN coverage areas (such as, $Area_1$ 330, $Area_2$ 340, $Area_3$ 350, and $Area_4$ 360) into multiple groups (e.g., Group A and Group B). As illustrated in FIG. 3B, APs in both $Area_1$ 330 and $Area_4$ 360 belong to Group A, and APs in both $Area_2$ 340 and $Area_3$ 350 belong to Group B. Note that, the tag and/or group identifier provides a way for a switch to identify the physical location of an AP that is not previously available information to the switch. In such cases, the disclosed system can further evaluate the distribution of APs associated with each tag or group across the multiple switch members of a stack, and attempt to achieve an even distribution within each group. Alternatively, instead of tagging or grouping the APs based on physical locations, a network system administrator may connect APs to ports of the switches in a particular sequence. The disclosed system will then attempt to achieve an even distribution of the APs according to their connected port numbers of the switch.

Figure 3C:
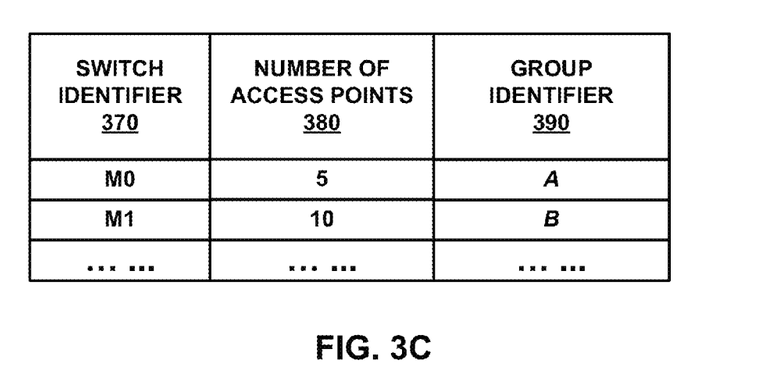

For example, FIG. 3C illustrates exemplary information that may be obtained directly or indirectly from the LLDP. Specifically, FIG. 3C includes a switch identifier 370, a number of access points 380, a group identifier 390, etc. Thus, according to FIG. 3C, the system can detect that switch member M0 has 5 APs connected to it and receiving PoE power from M0; and that switch member M1 has 10 APs connected to it and receiving PoE power from M1. In some embodiments, a network administrator can further divide up physical WLAN coverage areas into multiple groups. Thus, the system may further detect that the 5 APs that are connected to and receiving PoE power supply from M0 belong to group A, and that the 10 APs that are connected to and receiving PoE power supply from M1 belong to group B. Then, the disclosed system can temporarily disable power from a particular port of the switch member that a particular AP is connected to force the AP to be detected by the alternative port, and therefore allowing PoE power to be supplied from an alternative port.

In some embodiments, when some APs in the WLAN have dual-port functionalities whereas other APs in the WLAN do not have dual-port functionalities (i.e., single-port APs). The disclosed system may account for the single-port APs, if the single-port APs are not evenly distributed across different switch members in the stack. For example, assuming that 4 APs are connected to and receiving PoE power supply from $switch_1/member_0$. Among the 4 APs, 2 APs are also connected to $switch_2/member_1$ but not currently receiving PoE power supply from $switch_2/member_1$ (i.e., dual-port APs), and the other 2 APs are not connected to $switch_2/member_1$ (i.e., single-port APs that are only connected to $switch_1/member_0$). The disclosed system may intelligently determine that instead of distributing the dual-port APs evenly (e.g., allowing one dual-port AP to receive PoE power supply from $switch_1/member_0$ and the other dual-port AP to receive PoE power supply from $switch_2/member_1$), both dual-port APs will be disconnected from $switch_1/member_0$ and forced to receive PoE power supply from switch$_2$/member$_1$. Therefore, the system would eventually have two single-port APs receiving PoE power supply from switch$_1$/member$_0$ and two dual-port APs receiving PoE power supply from switch$_2$/member$_1$.

Now referring to the problem illustrated in FIG. 2A, since both APs (e.g., AP$_1$ 220 with MAC$_1$ and AP$_2$ 225 with MAC$_2$) receive PoE power supply from switch$_1$ 210 (also known as member$_0$), the system can detect that both MAC$_1$ and MAC$_2$ are connected to switch$_1$ 210 (also known as member$_0$) from the corresponding LLDP command results. For example, the disclosed system may detect that MAC$_1$ is connected to port$_0$ on switch$_1$ (member$_0$), and that MAC$_2$ is connected to port$_1$ on switch$_2$ 215 (member$_1$). Then, the disclosed system may determine that switch$_1$ 210 (member$_0$) is currently overloaded. Thus, the disclosed system can selectively switch off a particular port of a particular switch (e.g., port$_0$ of switch$_1$/member$_0$ 210), and force the AP (e.g., AP$_1$ 220) connected to the particular port of the particular switch to obtain PoE power from an alternative port (e.g., port$_1$ of switch$_2$/member$_1$ 215). Therefore, the system effectively forces AP$_1$ 220 to receive PoE power supply from switch$_2$ 215, and thereby achieving an even distribution of power among the APs connected to multiple switches in the switch stack.

Now referring to the problem illustrated in FIG. 2B-2E, assuming that using the above described mechanism, the disclosed system has achieved an even distribution of the APs across the two members of the switch stack. In FIG. 2D, when switch$_2$/member$_1$ 215 turns into an online state 240 again, the two APs are both connected to switch$_1$/member$_0$ 210. Using LLDP information, the disclosed system can intelligently switch off the particular port on switch$_1$ 210 that AP$_2$ 225 is connected to, and thus forcing AP$_2$ 225 to obtain PoE power from switch$_2$/member$_1$ 225 and return to the initiate state as illustrated in FIG. 2B.

Once the even distribution of the APs is achieved, the system usually will maintain the state without any physical change of environment or configuration changes, e.g., a user intervention (unplugging an AP or rebooting an AP) or switch/AP failure. The disclosed system can periodically perform a check to detect such events, and re-apply the same algorithm to achieve an even distribution state in response to a detected event.

Process for Eco-Friendly PoE

Figure 4:
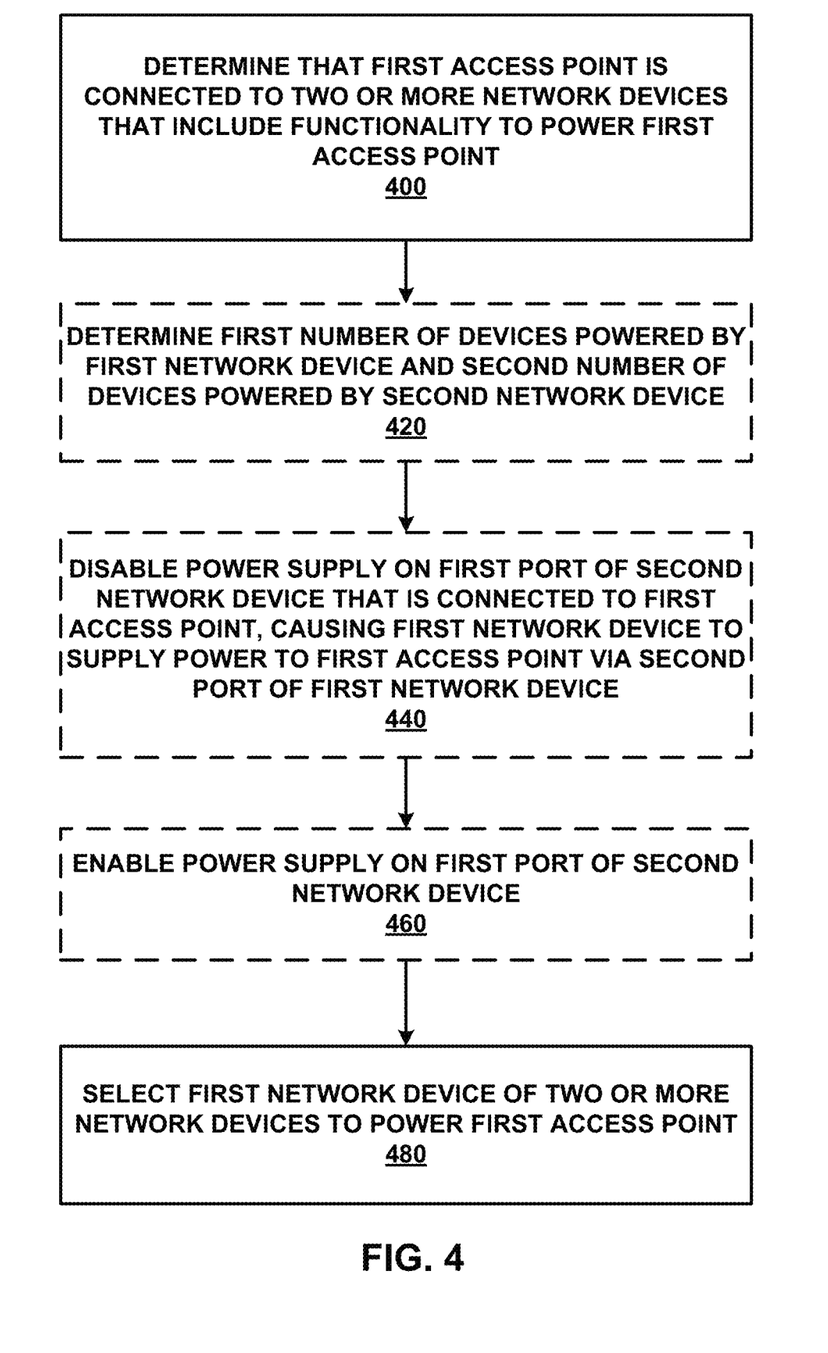
FIG. 4 illustrate an exemplary process for eco-friendly PoE according to embodiments of the present disclosure.

FIG. 4 illustrates an exemplary process for eco-friendly PoE according to embodiments of the present disclosure. During operations, a network device determines that a first access point is connected to two or more network devices that include functionality to power the first access point (operation 400), and selects a first network device of the two or more network devices to power the first access point (operation 480), thereby causing the first network device to power the first access point instead of the second network device. Note that, the first network device is different than a second network device, of the two or more network devices, that is currently powering the first access point;

In some embodiments, prior to the selecting the first network device to power the first access point, the disclosed network device optionally determines a first number of devices powered by the first network device and/or a second number of devices powered by the second network device (operation 420). Moreover, the disclosed network device can select the first network device based on the first number and/or the second number.

In some embodiments, prior to selecting the first network device to power the first access point, a second network device powers the first access point. Moreover, the disclosed network device can disable power supply on a first port of the second network device that is connected to the first access point (operation 440). Further, disabling power on the first port causes the first network device to supply power to the first access point via a second port of the first network device that is connected to the first access point.

In some embodiments, subsequent to the first network device supplying power to the first access point via the second port, the disclosed network device enables the power supply on the first port of the second network device (operation 460).

In some embodiments, the first access point may be a member of a group of access points. Each access point of the group of access points is connected to at least two network devices of the two or more network devices. Also, the disclosed network device selects the first network device to power the first access point based on balancing the power supply of the group of access points across the two or more network devices. In some embodiments, members in the group of access points are selected based on a shared location. In some embodiments, members in the group of access points are selected by an administrator. In some embodiments, the two or more network devices are switches in a stack.

In some embodiments, the disclosed network device determines a first number of devices powered by the first network device and/or a second number of devices powered by the second network device using LLDP.

In some embodiments, the disclosed network device periodically rebalances the power supply of the access points over the two or more network devices.

System for Eco-Friendly PoE

Figure 5:
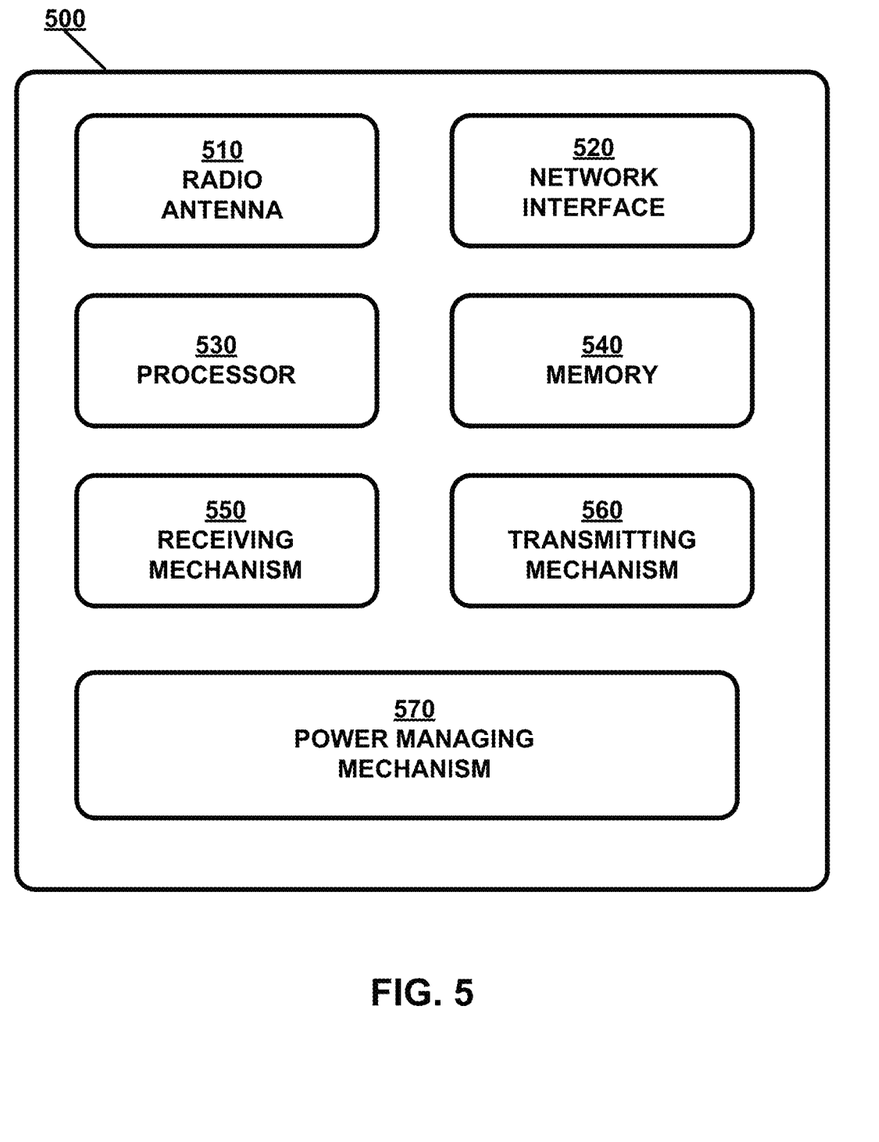
FIG. 5 is a block diagram illustrating an exemplary system for eco-friendly PoE according to embodiments of the present disclosure.

FIG. 5 is a block diagram illustrating a system for eco-friendly PoE according to embodiments of the present disclosure.

Network device 500 includes at least one or more radio antennas 510 capable of either transmitting or receiving radio signals or both, a network interface 520 capable of communicating to a wired or wireless network, a processor 530 capable of processing computing instructions, and a memory 540 capable of storing instructions and data. Moreover, network device 500 further includes an receiving mechanism 550, a transmitting mechanism 560, and a power management mechanism 570, all of which are in communication with processor 530 and/or memory 540 in network device 500. Network device 500 may be used as a client system, or a server system, or may serve both as a client and a server in a distributed or a cloud computing environment.

Radio antenna 510 may be any combination of known or conventional electrical components for receipt of signaling, including but not limited to, transistors, capacitors, resistors, multiplexers, wiring, registers, diodes or any other electrical components known or later become known.

Network interface 520 can be any communication interface, which includes but is not limited to, a modem, token ring interface, Ethernet interface, wireless IEEE 802.11 interface, cellular wireless interface, satellite transmission interface, or any other interface for coupling network devices.

Processor 530 can include one or more microprocessors and/or network processors. Memory 540 can include storage components, such as, Dynamic Random Access Memory (DRAM), Static Random Access Memory (SRAM), etc.

Receiving mechanism 550 generally receives one or more network messages via network interface 520 or radio antenna 510 from a wireless client. The received network messages may include, but are not limited to, requests and/or responses, beacon frames, management frames, control path frames, and so on.

Transmitting mechanism 560 generally transmits messages, which include, but are not limited to, requests and/or responses, beacon frames, management frames, control path frames, and so on.

Power managing mechanism 570 generally determines an optimal distribution of APs in the WLAN across multiple switch members in a switch stack, and causes a subset of the dual-port capable APs to receive PoE power supply from their respective alternative ports in order to achieve the optimal distribution.

Specifically, power managing mechanism 570 determines that a first access point is connected to two or more network devices that include functionality to power the first access point, for example, by using one of Link Layer Discovery Protocol (LLDP) or other neighbor discovery protocol. Note that, the neighbor discovery protocol uniquely identifies the first access point based at least on one of Media Access Control (MAC) address, host name, and tag information. Also, power managing mechanism 570 determines a first number of devices powered by a first network device and/or a second number of devices powered by a second network device, and selects the first network device of two or more network devices to power a first access point based on the first number and/or the second number. Note that, the second network device powers the first access point prior to selecting the first network device to power the first access point. Also note that, the first network device is different than a second network device, of the two or more network devices, that is currently powering the first access point.

Further, power managing mechanism 570 causes the first network device to power the first access point instead of the second network device, for example, by disabling power supply on a first port of the second network device that is connected to the first access point. In particular, disabling power on the first port causes the first network device to supply power to the first access point via a second port of the first network device that is connected to the first access point.

Subsequent to causing the first network device to supply power to the first access point via the second port, power managing mechanism 570 may enable the power supply on the first port of the second network device. In addition, power managing mechanism 570 periodically checks and rebalances the power supply of the access points over the two or more network devices.

In some embodiments, the first access point is a member of a group of access points, wherein each access point of the group of access points is connected to at least two network devices of the two or more network devices. Thus, selecting the first network device to power the first access point is based on balancing the power supply of the group of access points across the two or more network devices.

In some embodiments, members in the group of access points are selected based on a shared location. In some embodiments, members in the group of access points are selected by an administrator. In some embodiments, the two or more network devices are switches in a stack.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising:
    determining that a first access point is connected to two or more network devices that include functionality to power the first access point;
    determining a first number of devices powered by a first network device of the two or more network devices and a second number of devices powered by a second network device of the two or more network devices, wherein the first network device is different than the second network device, of the two or more network devices;
    selecting the first network device of the two or more network devices to power the first access point based in part on the first number and/or the second number that is currently powering the first access point and a particular port that the access point is connected to; and
    causing the first network device to power the first access point instead of the second network device
    wherein the selecting operation is based on balancing a power supply of the group of access points across the two or more network devices to draw a partial amount of a total power from each network device of the two or more network devices.

2. The medium of claim 1, wherein prior to selecting the first network device to power the first access point, the second network device powers the first access point, and wherein the causing operation comprises:
    disabling power supply on a first port of the second network device that is connected to the first access point,
    wherein disabling the power supply on the first port causes the first network device to supply power to the first access point via a second port of the first network device that is connected to the first access point.

3. The medium of claim 2, wherein subsequent to causing the first network device to supply power to the first access point via the second port, enabling the power supply on the first port of the second network device.

4. The medium of claim 1, wherein the first access point is a member of a group of access points, wherein each access point of the group of access points is connected to at least two network devices of the two or more network devices, and wherein the selecting operation is based on balancing a power supply of the group of access points across the two or more network devices.

5. The medium of claim 4, wherein members in the group of access points are selected based on a shared location.

6. The medium of claim 4, wherein members in the group of access points are selected by an administrator.

7. The medium of claim 1, wherein the two or more network devices are switches in a stack.

8. The medium of claim 1, wherein the determining that the first access point is connected to the two or more network devices that include functionality to power the first access point is performed using a neighbor discovery protocol comprising Link Layer Discovery Protocol (LLDP), wherein the neighbor discovery protocol uniquely identifies the first access point based at least on one of Media Access Control (MAC) address, host name, and tag information.

9. The medium of claim 1, wherein the operations further comprise periodically rebalancing the power supply of the access points over the two or more network devices.

10. A system comprising:
    two or more network devices;
    the system being configured to perform operations comprising:
        determining that:
            a first access point is connected to two or more network devices that include functionality to power the first access point, wherein the first access point is a member of a group of access points, and wherein members in the group of access points are selected based on a shared location; and
        selecting a first network device of the two or more network devices to power the first access point, wherein the first network device is different than a second network device, of the two or more network devices, that is currently powering the first access point, and wherein the first network device and the second network device are associated with a same switch stack; and
        causing the first network device to power the first access point instead of the second network device,
    wherein the selecting operation is based on balancing a power supply of the group of access points across the two or more network devices to draw a partial amount of a total power from each network device of the two or more network devices.

11. The system of claim 10, the system being configured to perform operations that further comprise:
    prior to the selecting operation: determining a first number of devices powered by the first network device and/or a second number of devices powered by the second network device,
    wherein the selecting of the first network device is based on the first number and/or the second number.

12. The system of claim 10, wherein prior to selecting the first network device to power the first access point, the second network device powers the first access point, and wherein the causing operation comprises:

disabling power supply on a first port of the second network device that is connected to the first access point, wherein disabling the power supply on the first port causes the first network device to supply power to the first access point via a second port of the first network device that is connected to the first access point.

13. The system of claim 12, wherein subsequent to causing the first network device to supply power to the first access point via the second port, the system being configured to perform operations that further comprise:

enabling the power supply on the first port of the second network device.

14. The system of claim 10, wherein each access point of the group of access points is connected to at least two network devices of the two or more network devices, and wherein the selecting operation is based on balancing the power supply of the group of access points across the two or more network devices.

15. The system of claim 14, wherein members in the group of access points are further selected by an administrator.

16. The system of claim 10, wherein the two or more network devices are switches in a stack.

17. The system of claim 10, wherein the determining operation is performed using a neighbor discovery protocol comprising Link Layer Discovery Protocol (LLDP), wherein the neighbor discovery protocol uniquely identifies the first access point based at least on one of Media Access Control (MAC) address, host name, and tag information.

18. The system of claim 10, wherein the system being configured to perform operations that further comprise:

periodically rebalancing the power supply of the access points over the two or more network devices.

19. A method comprising:

determining that a first access point is connected to two or more network devices that include functionality to power the first access point;

selecting a first network device of the two or more network devices to power the first access point, wherein:

the first network device is different than a second network device, of the two or more network devices, that is currently powering the first access point;

the first access point is a member of a group of access points, the group of access points identified by a smart tag, wherein each access point of the group of access points is connected to at least two network devices of the two or more network devices; and the selecting operation is based on balancing a power supply of the group of access points across the two or more network devices such that an even number of access points are powered by a first network device among the at least two network devices and a second network device among the at least two network devices; and causing the first network device to power the first access point instead of the second network device.

* * * * *